United States Patent
Yang et al.

(10) Patent No.: US 11,077,768 B2
(45) Date of Patent: Aug. 3, 2021

(54) PERSONALIZED RANGE PROTECTION STRATEGY FOR ELECTRIFIED VEHICLES

(71) Applicant: FORD GLOBAL TECHNOLOGIES, LLC, Dearborn, MI (US)

(72) Inventors: Xiao Guang Yang, Northville, MI (US); Jianbo Lu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 932 days.

(21) Appl. No.: 14/813,704

(22) Filed: Jul. 30, 2015

(65) Prior Publication Data

US 2017/0028912 A1 Feb. 2, 2017

(51) Int. Cl.
- *B60L 58/12* (2019.01)
- *B60Q 9/00* (2006.01)
- *F16H 63/42* (2006.01)
- *G08B 21/06* (2006.01)

(52) U.S. Cl.
CPC ............... *B60L 58/12* (2019.02); *B60Q 9/00* (2013.01); *B60L 2240/12* (2013.01); *B60L 2250/20* (2013.01); *B60L 2260/52* (2013.01); *Y02T 10/70* (2013.01)

(58) Field of Classification Search
CPC ........................................................ G06G 7/70
See application file for complete search history.

(56) References Cited

U.S. PATENT DOCUMENTS

| | | | |
|---|---|---|---|
| 8,346,419 B2 | 1/2013 | Kelty et al. | |
| 8,471,521 B2 | 6/2013 | Stewart et al. | |
| 8,536,825 B2 | 9/2013 | Kishiyama et al. | |
| 8,629,657 B2 | 1/2014 | Kishiyama et al. | |
| 8,803,470 B2 | 8/2014 | Stewart et al. | |
| 8,803,471 B2 | 8/2014 | Stewart et al. | |
| 8,849,507 B2 | 9/2014 | Popp et al. | |
| 8,930,125 B2 | 1/2015 | Fasse et al. | |
| 2009/0157290 A1* | 6/2009 | Ji | B60R 16/0236 701/123 |
| 2010/0057280 A1* | 3/2010 | Crowe | B60K 6/48 701/22 |

(Continued)

FOREIGN PATENT DOCUMENTS

| | | |
|---|---|---|
| CN | 102059957 | 5/2011 |
| CN | 103395375 A | 11/2013 |

(Continued)

OTHER PUBLICATIONS

Notification of Second Office Action, CN Application No. 2016105945980 dated Mar. 2, 2021.

*Primary Examiner* — Joseph H Feild
*Assistant Examiner* — Pameshanand Mahase
(74) *Attorney, Agent, or Firm* — David B. Kelley; Carlson, Gaskey & Olds

(57) ABSTRACT

A method according to an exemplary aspect of the present disclosure includes, among other things, controlling a vehicle system to refine a travel range estimation of an electrified vehicle if a desired destination cannot be reached under current driving conditions. The controlling step includes warning a driver about a travel range based on the driver's driving habits, coaching the driver to modify the driving habits, and adjusting operation of at least one vehicle subsystem.

24 Claims, 4 Drawing Sheets

(56) References Cited

U.S. PATENT DOCUMENTS

| | | | |
|---|---|---|---|
| 2011/0156641 A1* | 6/2011 | Kishiyama | H02J 7/0073 320/109 |
| 2011/0241861 A1* | 10/2011 | Levy | B60K 35/00 340/439 |
| 2012/0016581 A1 | 1/2012 | Mochizuki et al. | |
| 2012/0176231 A1* | 7/2012 | Skaff | B60K 35/00 340/439 |
| 2012/0239283 A1* | 9/2012 | Fasse | B60L 3/0046 701/123 |
| 2012/0251876 A1* | 10/2012 | Jagannathan | H01M 10/08 429/204 |
| 2013/0206493 A1* | 8/2013 | Larson | A63C 17/012 180/181 |
| 2014/0142770 A1* | 5/2014 | Sellschopp | G06F 1/26 700/291 |
| 2014/0229043 A1 | 8/2014 | Frank et al. | |
| 2014/0358367 A1 | 12/2014 | Copeland et al. | |

FOREIGN PATENT DOCUMENTS

| | | |
|---|---|---|
| EP | 0548748 A1 | 6/1993 |
| WO | 2013044357 A1 | 4/2013 |

* cited by examiner

PERSONALIZED RANGE PROTECTION STRATEGY FOR ELECTRIFIED VEHICLES

TECHNICAL FIELD

This disclosure relates to a vehicle system and method for an electrified vehicle. A battery management system of the vehicle system is adapted to provide personalized range protection if it is determined that a desired destination cannot be reached under current driving conditions.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of an electrified vehicle. The nominal travel range of an electrified vehicle equipped with a fully charged battery pack is typically estimated based on the driving habits of an average driver. However, a vehicle having the same battery charge level and operating under the same environmental conditions could result in different travel ranges for drivers with different driving habits. Accordingly, a driver cannot always assume that a desired destination is reachable based on the nominal travel range estimation.

SUMMARY

A method according to an exemplary aspect of the present disclosure includes, among other things, controlling a vehicle system to refine a travel range estimation of an electrified vehicle if a desired destination cannot be reached under current driving conditions. The controlling step includes warning a driver about a travel range based on the driver's driving habits, coaching the driver to modify the driving habits, and adjusting operation of at least one vehicle subsystem.

In a further non-limiting embodiment of the foregoing method, the vehicle system includes a control module configured to execute the controlling step.

In a further non-limiting embodiment of either of the foregoing methods, the refined travel range estimation is based on a combination of battery information, driver information and telematics information.

In a further non-limiting embodiment of any of the foregoing methods, the battery information includes at least battery usable energy, battery state of charge, battery power capabilities, and battery thermal states.

In a further non-limiting embodiment of any of the foregoing methods, the driver information includes at least the driving habits and driver preferences of the driver.

In a further non-limiting embodiment of any of the foregoing methods, the telematics information includes at least traffic conditions, weather conditions, and road conditions.

In a further non-limiting embodiment of any of the foregoing methods, the warning step and the coaching step include issuing a visual or audible output to the driver.

In a further non-limiting embodiment of any of the foregoing methods, the adjusting step includes reducing an auxiliary power usage associated with the at least one vehicle subsystem.

In a further non-limiting embodiment of any of the foregoing methods, the adjusting step includes automatically lowering the travel speed of the electrified vehicle.

In a further non-limiting embodiment of any of the foregoing methods, the adjusting step includes automatically maximizing regenerative braking.

In a further non-limiting embodiment of any of the foregoing methods, the step includes, after calculating the refined travel range estimation, determining whether the desired destination is reachable based on the refined travel range estimation.

In a further non-limiting embodiment of any of the foregoing methods, the step includes rerouting the electrified vehicle to a nearby charging station if the desired destination is not reachable based on the refined travel range estimation.

In a further non-limiting embodiment of any of the foregoing methods, the coaching step is performed only if manually turned ON.

In a further non-limiting embodiment of any of the foregoing methods, the method includes selecting the desired destination prior to performing the controlling step.

In a further non-limiting embodiment of any of the foregoing methods, the method includes collecting battery information, driver information and telematics information prior to performing the controlling step.

A vehicle system according to another exemplary aspect of the present disclosure includes, among other things, a high voltage battery pack, a vehicle subsystem selectively powered by the high voltage battery pack and a control system configured to warn a driver about a travel range based on the driver's driving habits and adjust operation of the vehicle subsystem if a desired destination cannot be reached under current driving conditions.

In a further non-limiting embodiment of the foregoing vehicle system, the control system is configured to coach the driver to modify the driving habits.

In a further non-limiting embodiment of either of the foregoing vehicle systems, the control system includes a battery management system.

In a further non-limiting embodiment of any of the foregoing vehicle systems, the control system is configured to receive battery information from the high voltage battery pack and navigation information from a navigation system.

In a further non-limiting embodiment of any of the foregoing vehicle systems, the control system is configured to receive driver information and telematics information.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system and method for maximizing a travel range of an electrified vehicle in a manner that is personalized to a driver's specific driving habits. An exemplary method includes controlling a battery management system of the electrified vehicle to provide the driver with personalized range protection. A personalized range protection strategy may include, but is not limited to, warning a driver about the travel range based on the driver's driving habits, coaching the driver to modify his/her driving habits, and adjusting operation of at least one vehicle subsystem if a desired destination cannot be reached under the current driving conditions. A vehicle system for executing the personalized range protection strategy is also contemplated. These and other features are discussed in greater detail in the following paragraphs of this detailed description.

Figure 1:
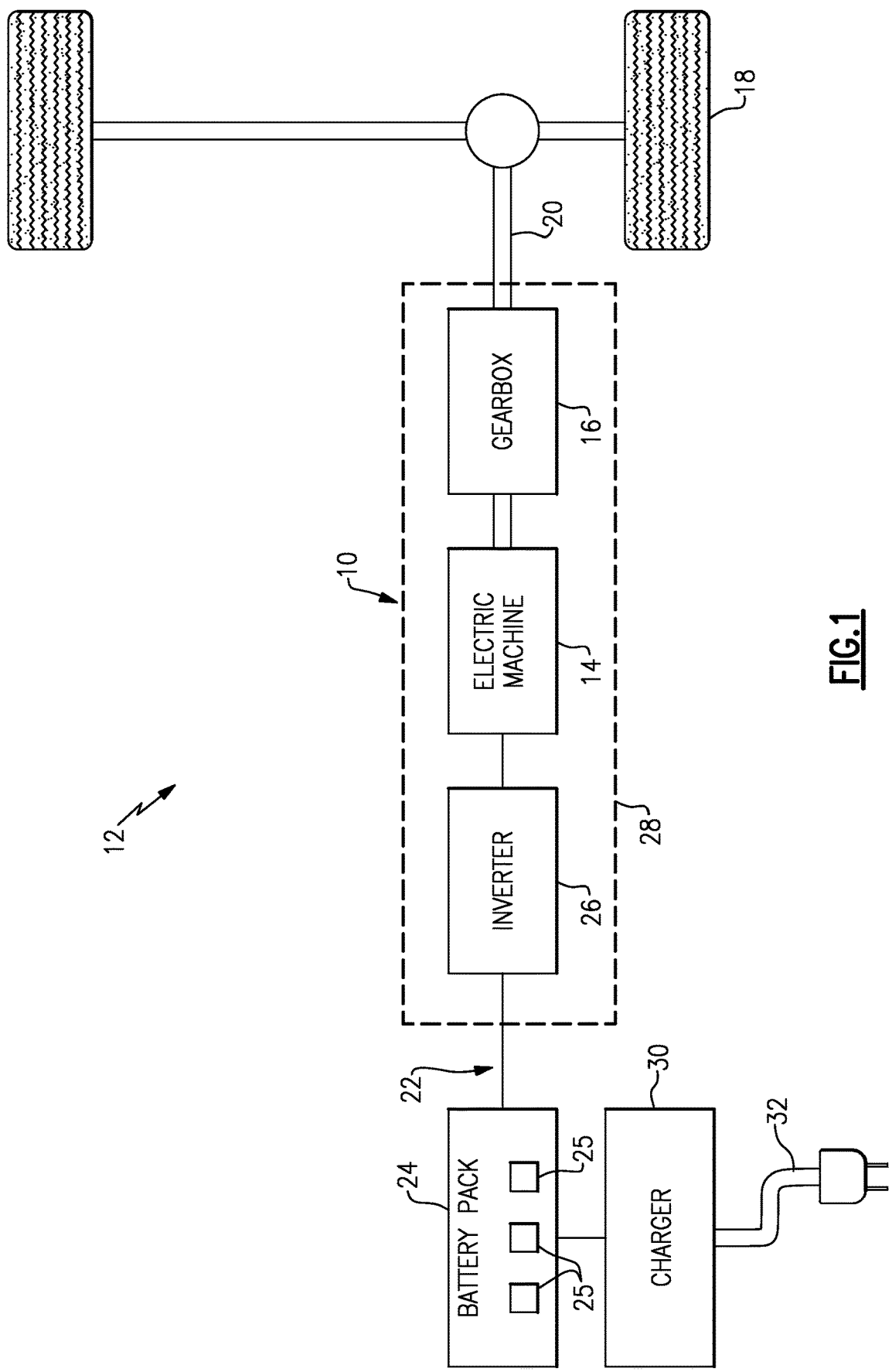
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including, but not limited to, plug-in hybrid electric vehicles (PHEV's), or fuel cell hybrid vehicles.

In one non-limiting embodiment, the electrified vehicle 12 is a full electric vehicle propelled solely through electric power, such as by an electric machine 14, without assistance from an internal combustion engine. The electric machine 14 may operate as an electric motor, a generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charger 30 for charging the energy storage devices of the battery pack 24. An electrical connector 32 connects the charger 30 to an external power supply (not shown) for receiving power. The charger 30 may be equipped with power electronics used to convert AC power received from the external power supply to DC power for charging the energy storage devices of the battery pack 24. The charger 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed within the powertrain 10.

Figure 2:
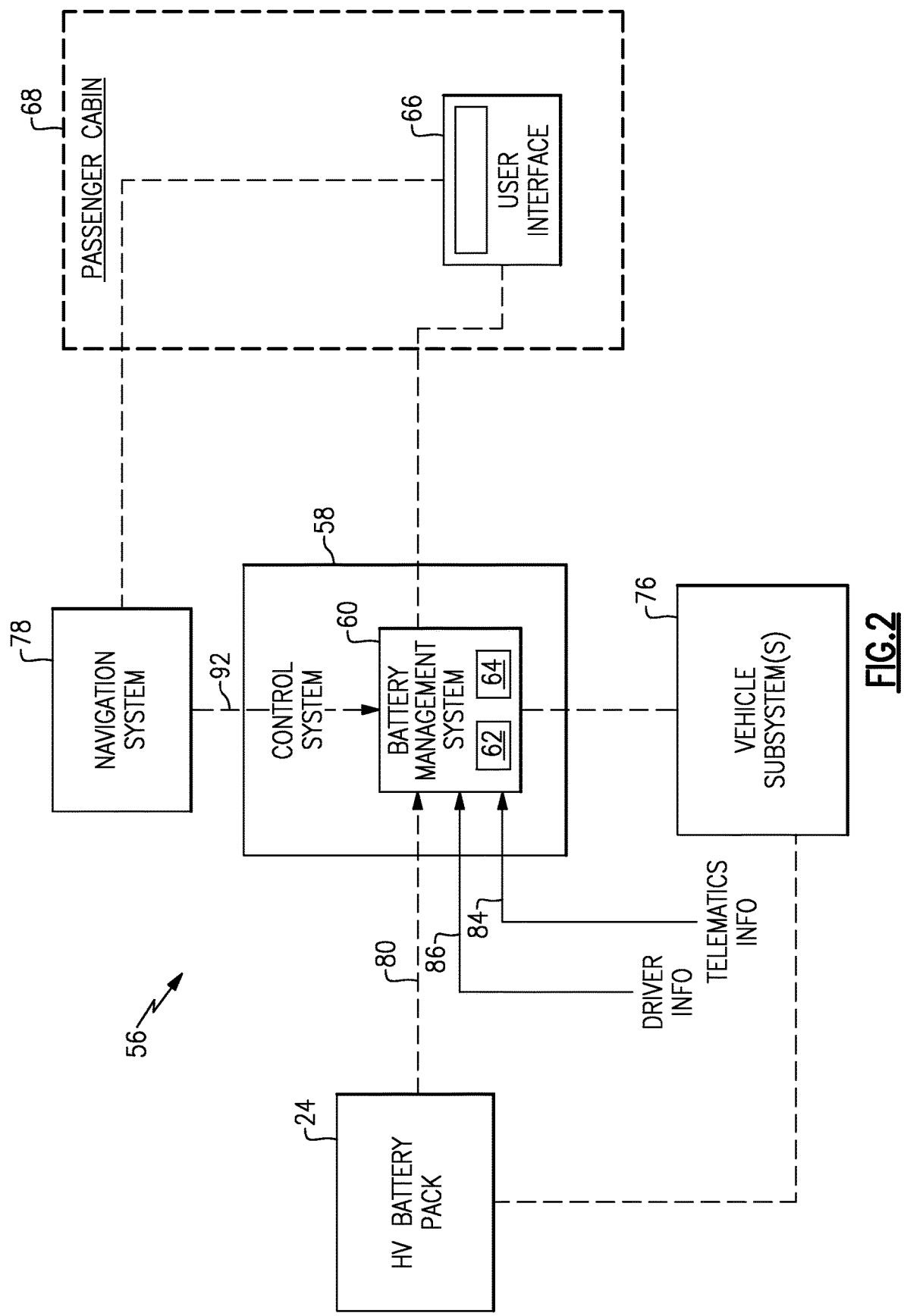
FIG. 2 illustrates a vehicle system of an electrified vehicle.

FIG. 2 is a highly schematic depiction of a vehicle system 56 that may be employed within a vehicle, such as the electrified vehicle 12 of FIG. 1. The vehicle system 56 is adapted to improve the accuracy of a travel range estimation for a given battery charge in a manner that is personalized to a driver's specific driving habits. Stated another way, the vehicle system 56 provides a personalized range protection strategy. The vehicle system 56 assists a driver to reach a desired destination, or a closest available charging station if the desired destination is not reachable, to avoid being left stranded on a roadway.

In one non-limiting embodiment, the exemplary vehicle system 56 includes a high voltage battery pack 24 and a battery management system 60 for monitoring and controlling the high voltage battery pack 24 and other vehicle subsystems 76. The high voltage battery pack 24 may include one or more battery assemblies each having a plurality of battery cells or other energy storage devices. The battery cells of the high voltage battery pack 24 store electrical energy that may be supplied to power various loads residing on-board an electrified vehicle. These loads may include various high voltage loads (e.g., electric machines, etc.) or various low voltage loads (e.g., lighting systems, low voltage batteries, logic circuitry, etc.).

The vehicle subsystems 76 may also be powered by the high voltage battery pack 24 and could include high voltage loads, low voltage loads, or both. Exemplary vehicle subsystems 76 include HVAC systems, lighting systems, entertainment systems, etc. Other vehicle subsystems are also contemplated within the scope of this disclosure.

The battery management system 60 is configured to monitor and control operation of the high voltage battery pack 24. For example, the battery management system 60 may manage the usable energy and state of charge (SOC) of the high voltage battery pack 24, manage the power capabilities of the high voltage battery pack 24 to meet drivability requirements, and thermally manage the high voltage battery pack 24 such that its full capability can be safely utilized. In another non-limiting embodiment, the battery management system 60 is operable to estimate the travel range of the electrified vehicle based on the amount of available energy levels, driving habits, environmental conditions, etc. The foregoing are but non-limiting examples of the many functions of the battery management system 60.

The battery management system 60 may be part of a control system 58. The control system 58 may be part of an overall vehicle control unit, such as a vehicle system controller (VSC) or could alternatively be a standalone control unit separate from the VSC. In one non-limiting embodiment, the control system 58 includes executable instructions for interfacing with and commanding operation of various components of the vehicle system 56. The control system 58 may include multiple inputs and outputs for interfacing with the various components of the vehicle system 56. In one non-limiting embodiment, the battery management system 60 of the control system 58 includes a processing unit 62 and non-transitory memory 64 for executing the various control strategies and modes of the vehicle system 56.

In another non-limiting embodiment, the control system 58 is adapted to monitor at least battery information 80 from the high voltage battery pack 24, navigation information 92 from a navigation system 78 (e.g., a global positioning system (GPS)), telematics information 84 and driver information 86 to provide a refined travel range estimation that is personalized to the driver. The battery information 80 collected and monitored by the control system 58 may include battery usable energy, battery SOC, battery power capabilities, battery thermal states, etc. The navigation information collected and monitored by the control system 58 may include various route and destination information.

The telematics information collected and monitored by the control system 58 may include traffic conditions, weather conditions, road conditions (e.g., slope, curvature, terrain, elevation, etc.), route segment conditions (e.g., class of road, speed limit, altitude, wind drag, wetness, etc.), and location information (e.g., charging station location and distance to host vehicle, charging station's distance to desired destination, etc.). The telematics information could be obtained from a geographic information system or from a mobile device of a driver or passenger of the electrified vehicle.

The driver information collected and monitored by the control system 58 may include driving habits, behavior, or aggressiveness (e.g., acceleration aggressiveness, braking aggressiveness, etc.), driving patterns, favorite or frequent routes, driver preferences (e.g., climate control preferences, etc.), etc. The driver information may be obtained by analyzing a driver's driving behaviors, routines, and preferences. In one non-limiting embodiment, the driver information is linked to the vehicle system 56 via a smart key or other smart device that is configured to store the driver information in the vehicle memory, such as the non-transitory memory 64 of the control system 58. The driver may access the driver information by using a user interface (see feature 66) of the vehicle system 56.

The foregoing listings of information collected and monitored by the control system 58 are not intended to provide an exhaustive list or limit this disclosure in any way. Other information may be collected and monitored by the control system 58 and may be considered when generating a refined travel range estimation that is personalized to a driver's driving habits and other environmental conditions.

In another non-limiting embodiment, the vehicle system 56 includes a user interface 66 for communicating information to a driver or passenger or for receiving information from the driver or other passenger. The user interface 66 may provide a visual output, an audible output, or both, to the driver or other passenger. In one non-limiting embodiment, the user interface 66 is located inside a passenger cabin 68 of the electrified vehicle for providing the ability to select various vehicle operating settings.

Figure 3:
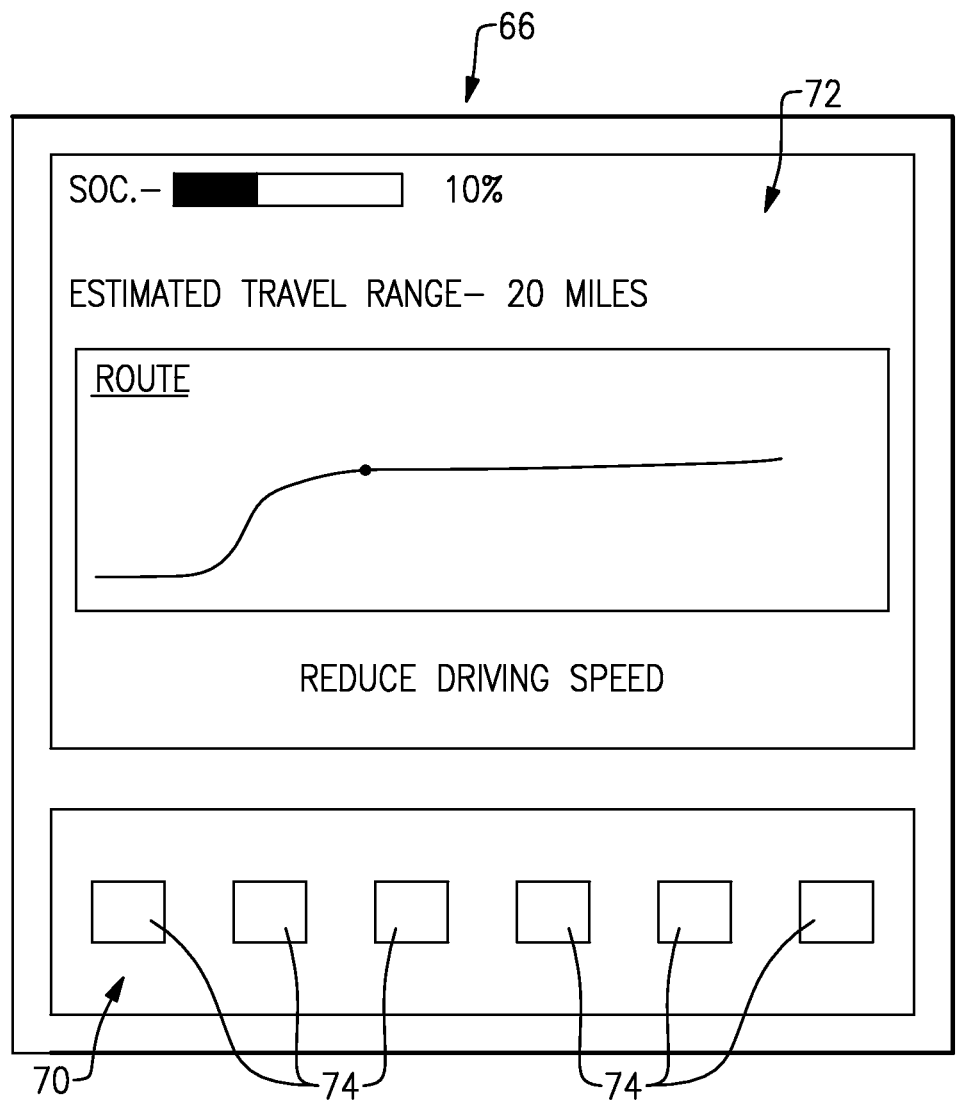
FIG. 3 illustrates a user interface of the vehicle system of FIG. 2.

FIG. 3 illustrates one non-limiting embodiment of the user interface 66. The user interface 66 may include a user input 70 and a display 72. The user input 70 can include various actuators, selectors, knobs, switches, touchscreens, or the like for inputting driver preferences. In one non-limiting embodiment, the user input 70 includes buttons 74 that are actuable to select a desired driving mode, a desired driver preference, or other information.

The display 72 is configured to provide various visual or audible outputs to a driver or other passenger of the electrified vehicle. For example, the display 72 may show the amount of available battery SOC, travel range warnings, travel range estimations, real time coaching instructions (i.e., instructions to the driver on how to drive the vehicle in a specific manner to reach a destination that is within a feasible range), route and other GPS information, telematics information, etc. These are intended to be non-limiting examples of the many types of information that could be outputted to the driver via the display 72.

Figure 4:
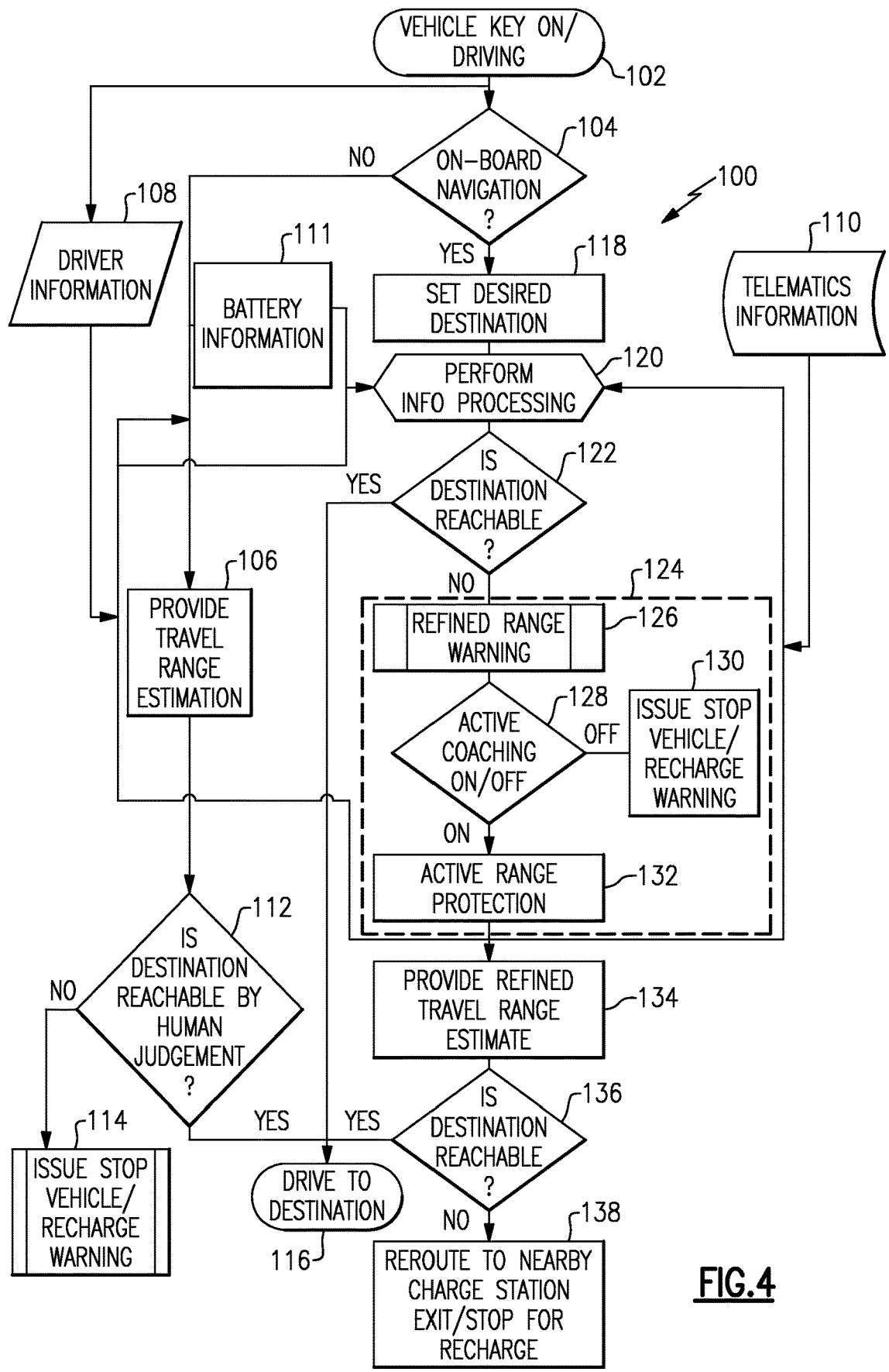
FIG. 4 schematically illustrates a control strategy for controlling a vehicle system of an electrified vehicle. The exemplary control strategy provides personalized range protection that is tailored to a driver's specific driving habits to help the driver reach a desired destination or guide the driver to reach a nearby charging station if the desired destination is unreachable with the amount of available energy.

FIG. 4, with continued reference to FIGS. 1-3, schematically illustrates a control strategy 100 for controlling the vehicle system 56 of the electrified vehicle 12. For example, the control strategy 100 can be performed to dynamically provide personalized range protection in a manner that balances battery usage and available battery SOC to reach a desired destination before the high voltage battery pack 24 is depleted of energy. In one non-limiting embodiment, the battery management system 60 of the control system 58 is programmed with one or more algorithms adapted to execute the control strategy 100, or any other control strategy. In another non-limiting embodiment, the control strategy 100 is stored as executable instructions in the non-transitory memory 64 of the battery management system 60.

The control strategy 100 may begin at block 102 in response to a vehicle Key-On/Driving condition. The Key-On/Driving condition may occur in response to a driver starting the electrified vehicle 12 to begin a drive cycle, in one non-limiting embodiment.

The control strategy 100 next determines whether the electrified vehicle 12 is equipped with an on-board navigation system 78 at block 104. If not equipped with the navigation system 78, the control strategy 100 proceeds to block 106 and provides a travel range estimation. The travel range estimation may be calculated based on a variety of factors and conditions, including but not limited to, driver information (shown schematically at block 108), telematics information (shown schematically at block 110) and battery information (shown schematically at block 111). In this way, the travel range estimate is a refined travel range estimation that is personalized to the driver's driving habits, other driving conditions, and environmental conditions.

Next, at block 112, the control strategy 100 determines whether or not a desired destination is reachable by human judgment. For example, the driver may compare the travel range estimate calculated at block 106 with a distance to destination as indicated by road signs or some other rough estimate after providing input of the estimated destination distance through the user interface 66. If the destination is not reachable, the driver is warned to stop the electrified vehicle and recharge at block 114. Such a warning can be displayed to the driver on the user interface 66. An audible warning may alternatively or additionally be issued. If, however, it is determined that the desired destination is reachable with the amount of available battery charge at block 112, the driver may simply drive to the desired destination at block 116.

In an alternative embodiment, such as if the control strategy 100 determines that the electrified vehicle 12 is equipped with the on-board navigation system 78 at block 104, the control strategy 100 may proceed to block 118 rather than block 106. The driver may select and set a desired destination using the user interface 66 at block 118. The desired destination represents the location the driver wishes to travel to.

At block 120, the control strategy 100 may undergo information processing to prepare to provide a refined travel range estimation. The information processing may be performed within the battery management system 60, for example. Information that may be considered, analyzed and processed by the control system 58 during block 120 includes, but is not limited to, driver information (see block 108), telematics information (see block 110) and battery information (see block 111). The information processing may include calculating an estimated range by dividing available on-board energy by the energy consumption rate. The energy consumption rate may take into account the present energy consumption rate and a projected energy consumption rate.

The control strategy 100 next determines whether the desired destination selected at block 118 is reachable at block 122. This may include comparing the distance required to reach the desired destination to a nominal travel range estimation. If the desired destination is reachable with the amount of available battery charge, the control strategy 100 proceeds to block 116 and the driver may simply drive to the desired destination.

However, if the answer is NO at block 122, a personalized range protection sequence 124 may be initiated. In one non-limiting embodiment, the personalized range protection sequence 124 includes a refined range warning feature, an active coaching feature and an active range protection feature for maximizing the travel range of the electrified vehicle 12. Each of these features is discussed in greater detail below.

The refined range warning feature of the personalized range protection sequence 124 is performed at block 126 of the control strategy 100. The refined range warning feature may include issuing a warning on the user interface 66 that indicates to the driver that the desired destination is likely not reachable under current driving conditions.

If turned ON, the active coaching feature of the personalized range protection sequence 124 is performed at block 128 of the control strategy 100. The active coaching feature may include prompting the driver to change his/her driving habits in order to preserve battery energy, or may include coaching the driver to alter their route to a nearby charging station. Coaching prompts of this type may be displayed on the user interface 66. If, alternatively, the active coaching feature is turned OFF at block 128, the control strategy 100 may proceed to block 130 by issuing a visual and/or audible warning to stop the electrified vehicle and recharge. The active coaching feature may be manually initiated by the driver or may be programmed to automatically initiate during a drive cycle.

The active range protection feature of the personalized range protection sequence 124 may be performed at block 132 of the control strategy 100. The active range protection feature may include intelligently and automatically reducing unnecessary energy consuming activities without sacrificing safe vehicle operation. For example, in one non-limiting embodiment, the active range protection feature may include reducing auxiliary power usage associated with the one or more vehicle subsystems 76. Such a reduction could include but is not limited to reducing or shutting down vehicle climate control air conditioning or heating loads, reducing or shutting down vehicle entertainments systems (e.g., radio, DVD, etc.), and turning off or varying intensity of vehicle lighting systems. In another non-limiting embodiment, the active range protection feature may include automatically lowering the travel speed of the electrified vehicle. In yet another non-limiting embodiment, the active range protection feature may include automatically maximizing regenerative braking. In yet another non-limiting embodiment, the active range protection feature may include regulating the temperature of the battery cells of the high voltage battery pack 24 during aggressive driving conditions to conserve energy. In yet another non-limiting embodiment, the active range protection feature may suggest a more energy efficient route for the driver to consider.

After the personalized range protection sequence 124 has been executed, the control strategy 100 may proceed to block 134 by issuing a refined travel range estimation. The refined travel range estimation is personalized to the driver's driving habits and other conditions and may be indicated on the user interface 66. Then, at block 136, the control strategy 100 determines whether the desired destination is reachable based on the refined travel range estimation. If YES, the control strategy 100 proceeds to block 116 and the driver may simply drive to the desired destination. If NO, however, the control strategy 100 proceeds to block 138 by rerouting the driver to a charging station that is within a feasible range for recharging the high voltage battery pack 24 of the electrified vehicle 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling a vehicle system to refine a travel range estimation of an electrified vehicle when a desired destination cannot be reached under current driving conditions, the controlling step including warning a driver about a travel range based on the driver's driving habits, coaching the driver to modify the driving habits, and adjusting operation of at least one vehicle subsystem in a manner that refines the travel range estimation,
wherein the vehicle system includes a control system configured to execute the controlling of the vehicle system.

2. The method as recited in claim 1, wherein the refined travel range estimation is based on a combination of battery information, driver information and telematics information.

3. The method as recited in claim 2, wherein the battery information includes at least battery usable energy, battery state of charge, battery power capabilities, and battery thermal states.

4. The method as recited in claim 2, wherein the driver information includes at least the driving habits and driver preferences of the driver.

5. The method as recited in claim 2, wherein the telematics information includes at least traffic conditions, weather conditions, and road conditions.

6. The method as recited in claim 1, wherein the warning step and the coaching step include issuing a visual or audible output to the driver.

7. The method as recited in claim 1, wherein the adjusting step includes reducing an auxiliary power usage associated with the at least one vehicle subsystem.

8. The method as recited in claim 1, wherein the adjusting step includes automatically lowering the travel speed of the electrified vehicle.

9. The method as recited in claim 1, wherein the adjusting step includes automatically maximizing regenerative braking.

10. The method as recited in claim 1, comprising, after calculating the refined travel range estimation, determining whether the desired destination is reachable based on the refined travel range estimation.

11. The method as recited in claim 10, comprising rerouting the electrified vehicle to a nearby charging station when the desired destination is not reachable based on the refined travel range estimation.

12. The method as recited in claim 1, wherein the coaching step is performed only when manually turned ON.

13. The method as recited in claim 1, comprising selecting the desired destination prior to performing the controlling step.

14. The method as recited in claim 1, comprising collecting battery information, driver information and telematics information prior to performing the controlling step.

15. The method as recited in claim 1, wherein the at least one vehicle subsystem is at least one of an HVAC system, a lighting system, and an entertainment system of the electrified vehicle.

16. The method as recited in claim 1, wherein warning the driver includes issuing the warning on a user interface of the electrified vehicle indicating that the desired destination is likely not reachable under the current driving conditions.

17. The method as recited in claim 1, wherein coaching the driver includes issuing a coaching prompt on a user interface of the electrified vehicle promoting the driver to either change the driver's driving habits or alter a driving route of the electrified vehicle.

18. A vehicle system, comprising:
a high voltage battery pack;
a vehicle subsystem selectively powered by said high voltage battery pack; and
a control system configured to warn a driver about a travel range based on the driver's driving habits and adjust operation of said vehicle subsystem in a manner that refines a travel range estimation when a desired destination cannot be reached under current driving conditions.

19. The vehicle system as recited in claim 18, wherein said control system is configured to coach the driver to modify the driving habits.

20. The vehicle system as recited in claim 18, wherein said control system includes a battery management system.

21. The vehicle system as recited in claim 18, wherein said control system is configured to receive battery information from said high voltage battery pack and navigation information from a navigation system.

22. The vehicle system as recited in claim 18, wherein said control system is configured to receive driver information and telematics information.

23. The vehicle system as recited in claim 18, wherein said vehicle subsystem is at least one of an HVAC system, a lighting system, and an entertainment system.

24. A method, comprising:
controlling a vehicle system to refine a travel range estimation of an electrified vehicle when a desired destination cannot be reached under current driving conditions, wherein controlling the vehicle system includes automatically reducing auxiliary power usage associated with a vehicle subsystem in a manner that increases a travel range of the electrified vehicle,
wherein automatically reducing the auxiliary power usage is executed by a control system module of the electrified vehicle.

* * * * *